(12) United States Patent
Doeppner et al.

(10) Patent No.: US 10,919,599 B2
(45) Date of Patent: Feb. 16, 2021

(54) BICYCLE HAVING ELECTRIC DRIVE OR AUXILIARY DRIVE

(71) Applicant: Mahle International GmbH, Stuttgart (DE)

(72) Inventors: Enrico Doeppner, Grossenlueder (DE); David Moczko, Stuttgart (DE); Amir Oploh, Neufahrn (DE); Sebastian Stoll, Munich (DE); Christian Wirth, Mossinning (DE)

(73) Assignee: MAHLE INTERNATIONAL GMBH

( * ) Notice: Subject to any disclaimer, the term of this patent is extended or adjusted under 35 U.S.C. 154(b) by 0 days.

(21) Appl. No.: 16/616,407

(22) PCT Filed: May 18, 2018

(86) PCT No.: PCT/EP2018/063135
§ 371 (c)(1),
(2) Date: Nov. 26, 2019

(87) PCT Pub. No.: WO2018/215347
PCT Pub. Date: Nov. 29, 2018

(65) Prior Publication Data
US 2020/0086947 A1    Mar. 19, 2020

(30) Foreign Application Priority Data

May 23, 2017 (DE) .......................... 10 2017 208 714
Sep. 1, 2017 (DE) .......................... 10 2017 215 349

(51) Int. Cl.
*B62M 6/20* (2010.01)
*B62M 6/55* (2010.01)
(Continued)

(52) U.S. Cl.
CPC ................. *B62M 6/20* (2013.01); *B62M 6/55* (2013.01); *B62M 11/18* (2013.01); *F16D 41/24* (2013.01); *B62M 11/04* (2013.01)

(58) Field of Classification Search
CPC ........... B62M 6/20; B62M 6/55; B62M 11/04
(Continued)

(56) References Cited

U.S. PATENT DOCUMENTS 5,845,727 A    12/1998 Miyazawa et al.
5,909,781 A *  6/1999 Yonekawa ............... B62M 6/55
                                              180/206.4
(Continued)

FOREIGN PATENT DOCUMENTS

CN    202541770 U    11/2012
CN    106458197 A     2/2017
(Continued)

OTHER PUBLICATIONS

Chinese Office Action, Appl. No. 201880034102.1, dated May 22, 2020.
(Continued)

*Primary Examiner* — Jacob D Knutson
*Assistant Examiner* — Felicia L. Brittman
(74) *Attorney, Agent, or Firm* — Fishman Stewart PLLC

(57) ABSTRACT

An electric drive for a bicycle is disclosed. The drive includes an electric motor including an drive shaft, a driven shaft connected in a rotationally fixed manner to a driving gear for coupling to a wheel drive, and a transmission structured and arranged to drivingly connect the drive shaft to the driven shaft. The transmission includes a driven wheel, which is connected in a rotationally fixed manner to the driven shaft in a rotational drive direction, and at least two output gears. The at least two output gears includes a first output gear and a second output gear that each engage
(Continued)

with the driven gear offset to one another in a circumferential direction to drive the driven wheel.

22 Claims, 5 Drawing Sheets

(51) Int. Cl.
  *B62M 11/18* (2006.01)
  *F16D 41/24* (2006.01)
  *B62M 11/04* (2006.01)
(58) Field of Classification Search
  USPC ....................................................... 180/205.2
  See application file for complete search history.

(56) References Cited

U.S. PATENT DOCUMENTS

| | | | |
|---|---|---|---|
| 6,296,072 B1* | 10/2001 | Turner | ................... B62M 11/18 180/220 |
| 7,575,192 B1 | 8/2009 | Kish | |
| 9,302,734 B2 | 4/2016 | Getta et al. | |
| 10,137,963 B2 | 11/2018 | Niki | |
| 2017/0051801 A1 | 2/2017 | Poertzgen et al. | |
| 2017/0217537 A1 | 8/2017 | Yamamoto | |
| 2017/0313382 A1* | 11/2017 | Suzuki | ..................... B62M 6/55 |

FOREIGN PATENT DOCUMENTS

| | | | |
|---|---|---|---|
| DE | 102017201325 A1 * | 8/2017 | ............ B62M 11/06 |
| DE | 102017201325 A1 | 8/2017 | |
| EP | 2838783 A1 | 2/2015 | |
| JP | S56-160348 U | 11/1981 | |
| JP | S63-92857 A | 4/1988 | |
| JP | H07-54974 A | 2/1995 | |
| JP | H09-2368 A | 1/1997 | |
| JP | 2016/222123 A | 12/2016 | |
| WO | 0043259 A1 | 7/2000 | |
| WO | 2013156445 A1 | 10/2013 | |

OTHER PUBLICATIONS

Chinese Search Report, Appl No. 2018800341021, dated May 14, 2020.

Japanese Office Action, Appl. No. 2019-564935, dated Jul. 7, 2020.

* cited by examiner

BICYCLE HAVING ELECTRIC DRIVE OR AUXILIARY DRIVE

CROSS-REFERENCE TO RELATED APPLICATIONS

This application claims priority to International Patent Application No. PCT/EP2018/063135 filed on May 18, 2018, and also claims priority to German Patent Application DE 10 2017 208 714.5 filed on May 23, 2017 and German Patent Application DE 10 2017 215 349.0 filed on Sep. 1, 2017, the contents of each of which is hereby incorporated by reference in their entirety.

TECHNICAL FIELD

The present invention relates to an electric drive or auxiliary drive, respectively, for a bicycle as well as to a bicycle, which is equipped with such an electric drive or auxiliary drive, respectively.

BACKGROUND

Bicycles comprising an electric drive are generally known as "e-bike". The electric drive can thereby serve as sole drive, thus as main drive, but preferably as auxiliary drive. In the context at hand, the term "drive" is understood as a main drive as well as an auxiliary drive. In the case of an auxiliary drive, the electric motor supports the drive power of the respective bicycle rider. In the case of a so-called "pedelec", only such a drive support takes place. An electric motor drive of the bicycle without personal drive power by the bicycle rider is not provided in the case of a pedelec. Provided that the drive is embodied as main drive, the bicycle can also be driven only via the electric drive. In the context at hand, the term "bicycle" is not only understood as two-wheelers, but also three-wheelers or four-wheelers.

Such an electric drive usually comprises an electric motor, which has an drive shaft. A driven shaft is further provided, which is connected in a rotationally fixed manner to a driving gear. The driving gear serves for coupling to a chain drive or belt drive or another wheel drive of the bicycle, which serves to drive a driven wheel of the bicycle, which is usually a rear wheel of the bicycle. In other words, in the installed state, the driving gear is drivingly connected to a rear wheel of the bicycle via a chain or via a belt or via a different coupling. The drive, but at least the driven shaft, is accordingly located in the area of pedal shaft of the bicycle. The electric drive further comprises a transmission, which drivingly connects the drive shaft to the driven shaft. The comparatively high speed of the electric motor can thereby be reduced to the comparatively low speed of the driven shaft. The torque provided with the help of the electric motor can thus simultaneously be increased accordingly. The transmission can have, for example, a driven gear, which is connected in a rotationally fixed manner to the driven shaft in a rotational drive direction. The "wheels" of the transmission are preferably gearwheels.

Provided that the electric drive is arranged in the area of a pedal shaft, the diameter of the driven gear is limited, so that the ground clearance of the bicycle is not negatively impacted. Relatively high torques have to accordingly be applied to this driven gear. For this purpose, the transmission has, for example, an output gear, which engages with the driven gear. In the case of a conventional electric drive, driven gear and output gear have to be made of metal for the transmission of large torques. Metallic wheels are comparatively expensive and are often the cause for noise problems in the drive.

An unmanned aircraft is known from U.S. Pat. No. 7,575,192 B1, which, for driving a propeller, has a microturbine, the drive shaft of which is coupled via a transmission to a propeller shaft supporting the propeller. In this transmission, a power distribution is realized, in the case of which a driven input gearwheel simultaneously engages with two first gearwheels, which in each case communicate in a rotationally fixed manner with a second gearwheel. These second gearwheels simultaneously engage with a common output gearwheel.

A generic electric drive for a bicycle is known from WO 00/43259 A1 and comprises an electric motor, which has a drive shaft, a driven shaft, which is connected in a rotationally fixed manner to a driving gear for coupling to a wheel drive of the bicycle, and a transmission, which drivingly connects the drive shaft to the driven shaft. In the case of the known drive, this transmission is realized as two-stage planetary transmission, in the case of which an input-side first set of first sun gear, first planet gears, and first planet carrier, and an output-side second set of second sun gear, second planet gears, and second planet carrier are arranged in a common ring gear. The first sun gear is connected in a rotationally fixed manner to the rotor of the electric motor. The first planet carrier forms a rotationally fixed unit with the second sun gear. The second planet carrier is coupled via a ratchet coupling to the driven shaft, which forms a rotationally fixed unit with the driving gear.

Another electric drive for a bicycle is known from WO 2013/156445 A1. On the input side, the transmission has a one-stage planetary transmission, which is coupled to the electric motor, and, on the output side, a traction drive, which is coupled to the planetary transmission, comprising a toothed belt.

SUMMARY

The present invention deals with the problem of specifying an improved embodiment for an electric drive of the above-described type or for a bicycle equipped therewith, respectively, which is characterized in particular by a cost-efficient producibility and/or by a reduced noise development.

This problem is solved according to the invention by means of the subject matter of the independent claim(s). Advantageous embodiments are the subject matter of the dependent claims.

The invention is based on the general idea of equipping the transmission with at least two output gears, which serve to drive the driven gear and which, for this purpose, in each case individually engage with the driven gear. For this purpose, the at least two output gears are arranged on the circumference of the driven gear, offset to one another in the circumferential direction. Via a suitable power distribution realized in the transmission, the drive power of the electric motor is distributed to the at least two output gears. These measures have the result that the torque, which is to be applied as a whole to the driven gear, is distributed to at least two engagement points, namely to the engagement points of the at least two output gears. The load of the driven gear and of the respective output gear is thereby significantly reduced in the respective engagement. In the case of an even power distribution to exactly two output gears, the torque is halved in the respective engagement point. The at least two output gears, which will also be referred to hereinafter as "first output gear" and "second output gear", thus in each case individually introduce a portion of the drive power into the driven gear. Due to the significantly reduced torques at the respective engagement point, it is possible in particular to make the output gears and/or the driven gear of plastic. The production costs can therefore be reduced. The risk of a noise development is furthermore reduced.

It can advantageously be provided that a first axis of rotation, about which the first output gear rotates, and a second axis of rotation, about which the second output gear rotates, are arranged inside the transmission in a stationary manner. A compact design, which can be realized easily, is attained thereby.

An embodiment is particularly advantageous, in the case of which a first axis of rotation, about which the first output gear rotates, and a second axis of rotation, about which the second output gear rotates, are arranged geometrically between an output axis, about which the driven shaft rotates, and an input axis, about which the drive shaft rotates. On the one hand, a compact design is supported thereby. On the other hand, the ground clearance for the bicycle in the area of the drive can be increased thereby. In the installed state, the drive is arranged essentially above a pedal shaft of the bicycle, when the bicycle stands or moves on a surface. In this installed state, the driven shaft is located in the area of the pedal shaft and thus forms the lowest area of the drive. In the installed state, the output gears are thus located above the driven shaft and below the drive shaft.

In the context at hand, a "shaft" is understood to be a physical component, while an "axis" is understood to be an imaginary straight line. In the case of a rotating shaft, the corresponding axis of rotation thus coincides with the longitudinal central axis of the shaft.

According to an advantageous embodiment, the power distribution is realized in the transmission in that the first output gear is connected in a rotationally fixed manner to a first intermediate gear, while the second output gear is connected in a rotationally fixed manner to a second intermediate gear. The transmission furthermore has an input gear, which engages with the first intermediate gear and with the second intermediate gear. The input gear is now drivingly connected to the drive shaft inside the transmission. The above-mentioned power distribution thus results in that the input gear distributes its drive power to the two intermediate gears, which engage therewith and which then transmit said drive power to the driven gear via the two output gears at different engagement points, so that all of the drive power is ultimately available again at the driven gear.

A further development is advantageous, in the case of which the first intermediate gear has a larger number of teeth than the first output gear, wherein the second intermediate gear advantageously also has a larger number of teeth than the second output gear. A transmission is thereby realized, which increases the torque provided at the input gear, so that an increased torque is ultimately available at the driven gear.

In the case of another embodiment, it can be provided that the first intermediate gear radially engages over the driven gear on a first axial side, while the second intermediate gear radially engages over the driven gear on a second axial side. This results in a radially compact design, in the case of which the driven gear is located axially between the first intermediate gear and the second intermediate gear. In the case of this embodiment, the input gear can advantageously be axially divided in such a way that it has a first partial input gear and a second partial input gear. The first partial input gear engages with the first intermediate gear on the first axial side of the driven gear. The second partial input gear engages with the second intermediate gear on the second axial side of the driven gear. With this measure, the two partial input gears are thus located axially on both sides of the driven gear, whereby it is possible to position a shaft, which connects the two partial input gears in a rotationally fixed manner to one another, radially comparatively close to the circumference of the driven gear. The partial input gears and the driven gear can thereby in particular overlap one another radially in the axial viewing direction. These measures thus support a compact design.

Another embodiment proposes that the first intermediate gear and the second intermediate gear radially engage over the driven gear on the same axial side. The two intermediate gears can thereby in particular be located in the same axial plane, so that a compact design is realized in the axial direction.

In the case of a further development, the first intermediate gear can engage with a first axial section of the input gear, while the second intermediate gear engages with a second axial section of the input gear, which is arranged on the input gear axially offset to the first axial section. Two engagement points with the two intermediate gears, which are axially offset to one another, are thus realized at the input gear, whereby the load of the input gear is reduced at these engagement points.

An advantageous further development proposes that the first axial section of the input gear has a first axial end of the input gear and is axially spaced apart from a second axial end of the input gear. In contrast, the second axial section of the input gear has the second axial end of the input gear and is axially spaced apart from the first axial end of the input gear. The first intermediate gear can now engage with the input gear axially spaced apart from the second axial end of the input gear, while the second intermediate gear engages with the input gear axially spaced apart from the first axial end of the input gear. This measure also reduces the load of the input gear and leads to a compact design.

It can advantageously be provided that on its circumference, the input gear is dimensioned approximately equally large as the sum of the axial dimensions of the two intermediate gears on the circumference thereof. Axially separate engagement points for the two intermediate gears are thus realized on the input gear with axially compact design.

Another embodiment proposes that the first intermediate gear and the second intermediate gear engage with the input gear axially offset to one another. This measure also reduces the load of the input gear.

According to an advantageous embodiment, the axial offset of the two intermediate gears on the input gear can be selected in such a way that it is possible to position the intermediate gears on the input gear in such a way that they intersect one another in the axial viewing direction. In other words, it can be provided according to a further development that the first intermediate gear and the second intermediate gear radially engage over one another. This measure can also support a compact design of the transmission ratio.

Inside the transmission, a first transmission path leads from the input gear via the first intermediate gear and via the first output gear to the driven gear, while a second transmission path leads from the input gear via the second intermediate gear and via the second output gear to the driven gear. The first transmission path and the second transmission path advantageously define the same transmission ratio.

According to a further development, it can now be provided that the first intermediate gear and the second intermediate gear have the same number of teeth and that the first output gear and the second output gear have the same number of teeth. The two transmission paths are thus embodied identically. The intermediate gears can thereby in particular be designed as identical parts. The output gears can likewise be designed as identical parts.

In contrast, an alternative embodiment proposes that the first intermediate gear and the second intermediate gear have different numbers of teeth and that the first output gear and the second output gear have different numbers of teeth. The two transmission paths are thus different, but still ultimately define the same transmission ratio. Such an embodiment can lead to installation space advantages.

The input gear can advantageously be connected in a rotationally fixed manner to the drive shaft, whereby the transmission is constructed to be particularly compact. In the case of this embodiment, the electric motor thus drives the input gear directly via its drive shaft.

In contrast, it can be provided in the case of an alternative embodiment that the input gear is connected in a rotationally fixed manner to the output of a further single-stage or multi-stage transmission section, e.g. in the form of a planetary transmission, which is connected to the drive shaft on the input side. For example, the input gear can be connected in a rotationally fixed manner to a planet gear carrier of the planetary transmission.

Another embodiment proposes that the driven shaft is formed by a pedal shaft. The drive cooperates directly with the pedal shaft in this case.

It can advantageously be provided that the driven gear is connected to the driven shaft via a freewheel assembly, which transmits a torque from the driven gear to the driven shaft in the rotational drive direction, and which allows for a relative rotation between driven gear and driven shaft in a counter-rotational direction opposite to the rotational drive direction.

In the case of a preferred embodiment, the driven shaft can be embodied as hollow shaft and can be coaxially permeated by a pedal shaft. The pedal shaft is thereby connected in a rotationally fixed manner to the driven shaft in the rotational drive direction. The realization of the auxiliary drive is simplified with this measure. In the operational installed state, thus on the bicycle, the pedal shaft is in each case provided with a pedal crank on its longitudinal ends, wherein the respective pedal crank in each case supports a pedal, so that the bicycle rider can introduce his drive power into the drive via the pedals, pedal cranks, and pedal shaft.

The pedal shaft can preferably be connected to the driven shaft via a freewheel assembly, which transmits a torque from the pedal shaft to the driven shaft in the rotational drive direction, and which allows for a relative rotation between pedal shaft and driven shaft in a counter-rotational direction opposite to the rotational drive direction. With the help of this freewheel assembly, the driven shaft can rotate quicker in the rotational drive direction than the pedal shaft. The pedal shaft can likewise be rotated with a direction of rotation opposite the direction of rotation of the driven shaft.

According to an advantageous embodiment, at least one of the output gears and/or the input gear and/or at least one of the intermediate gears and/or the driven gear can be made of plastic. The risk of a noise development on the one hand and production costs on the other hand are thus reduced.

A bicycle according to the invention comprises a pedal shaft as well as a wheel drive, such as, e.g., a chain drive or a belt drive, and is furthermore equipped with an electrical drive of the above-introduced type. In the usual way, the bicycle furthermore has at least one front while and at least one rear wheel. The wheel drive serves to drive a driven wheel of the bicycle, which is usually a rear wheel.

A design is preferred, in the case of which the output gears are arranged on a side of the driven shaft facing away from the surface, when the bicycle stands or moves on a surface. The bicycle thereby gains ground clearance in the area of the drive.

A design is particularly advantageous, in the case of which, apart from the driven gear, the transmission is arranged above the driven shaft, when the bicycle stands or moves on a surface.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, wherein identical reference numerals refer to identical or similar or functionally identical components.

BRIEF DESCRIPTION OF THE DRAWINGS

In each case schematically.

DETAILED DESCRIPTION

Figure 1:
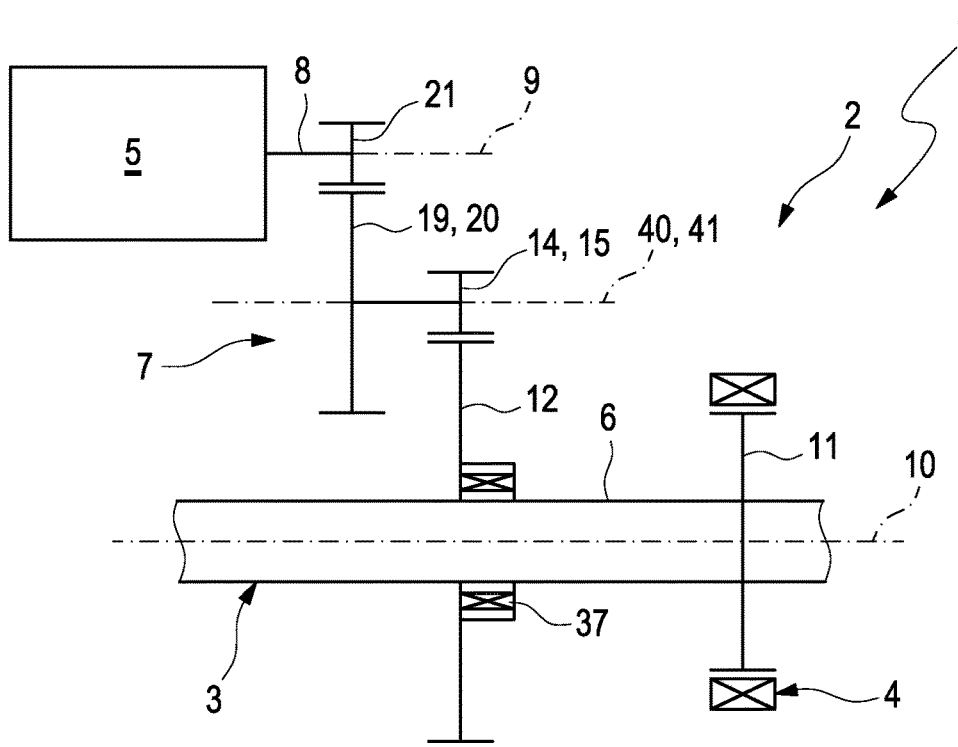
FIG. 1 shows a schematic diagram of an electric drive.
Figure 2:
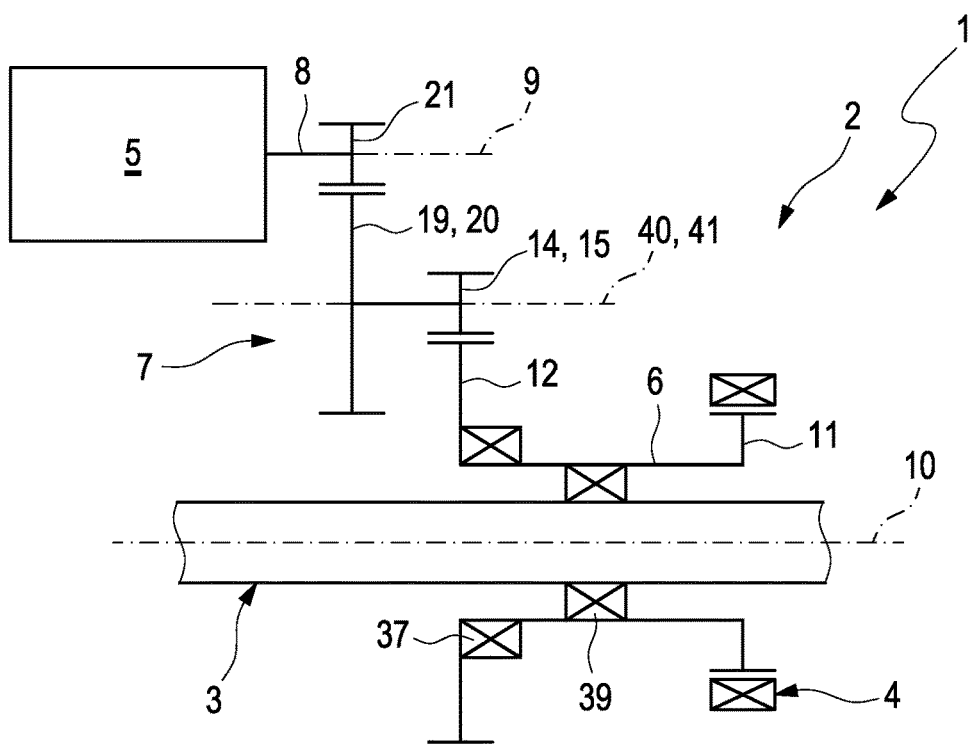
FIG. 2 shows a schematic diagram of the electric drive, but in the case of another embodiment.

According to FIGS. 1 and 2, a bicycle 1, which is illustrated only in the area of an electric drive 2 here, comprises a pedal shaft 3 as well as a wheel drive 4, which is preferably embodied as chain drive 4 or as belt drive 4. A universal drive 4 is generally also conceivable. The wheel drive 4 serves to drive a driven wheel, which is not shown here, of the bicycle 1, which is preferably a rear wheel of the bicycle 1. The bicycle 1 furthermore comprises the above-mentioned drive 2. In the completely mounted state of the bicycle 1, the pedal shaft 3, which is part of the structural volume of the drive 2 here, is in each case connected in a rotationally fixed manner to a pedal crank, which is not shown here, on its longitudinal ends, on which a pedal is in each case located, which is also not shown here.

According to FIGS. 1 to 9, the electric drive 2 comprises an electric motor 5, a driven shaft 6, and a transmission 7. The electric motor 5 has a drive shaft 8, which rotates about an input axis 9. The driven shaft 6 rotates about an output axis 10 and is connected in a rotationally fixed manner to a driving gear 11, which is preferably a gearwheel. Via the driving gear 11, the drive 2 is connected to the wheel drive 4, in particular to the chain drive 4 or to the belt drive 4, respectively, or to the universal drive 4, respectively.

Figure 4:
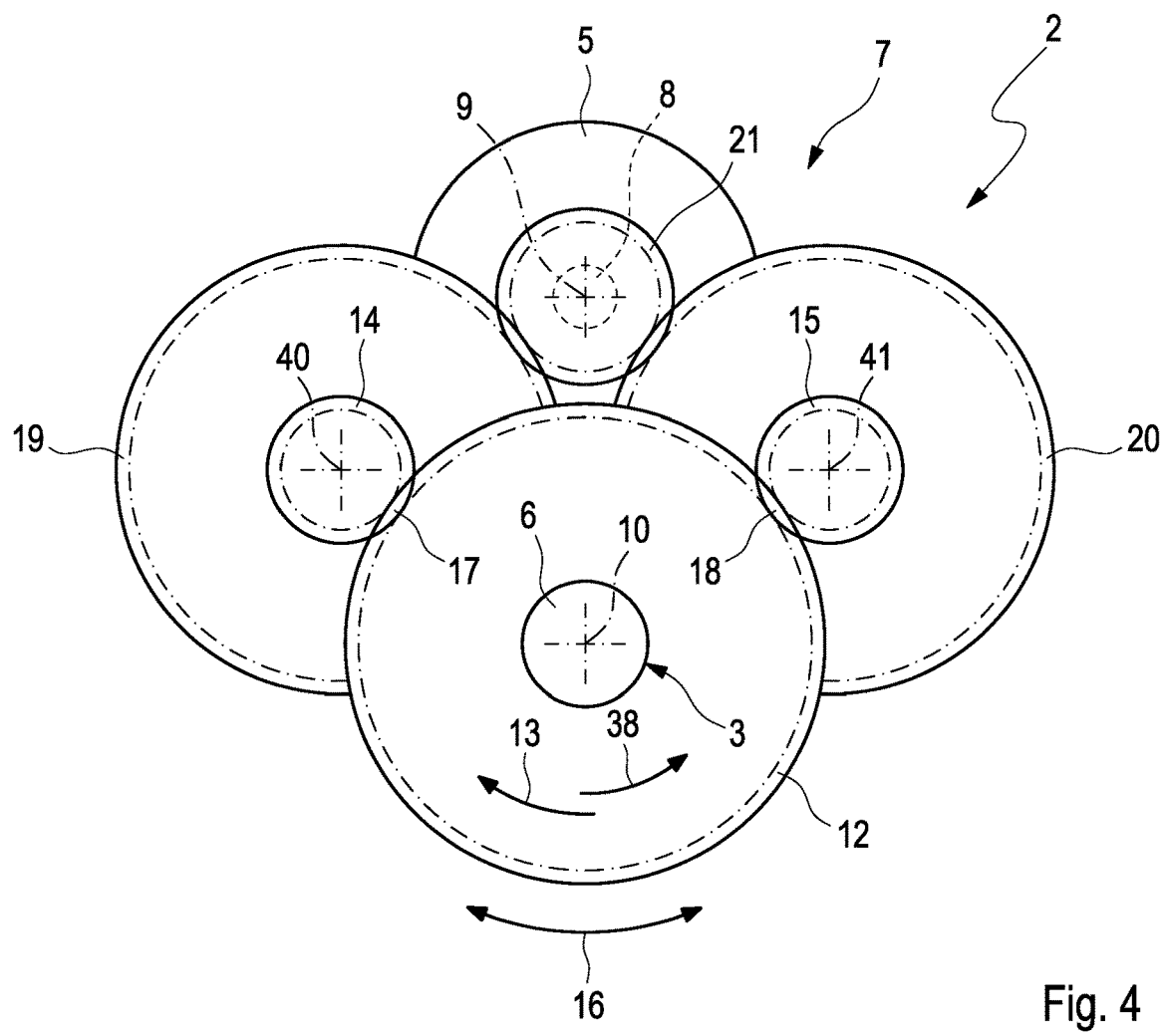
FIG. 4 shows an axial view onto a portion of the drive.
Figure 7:
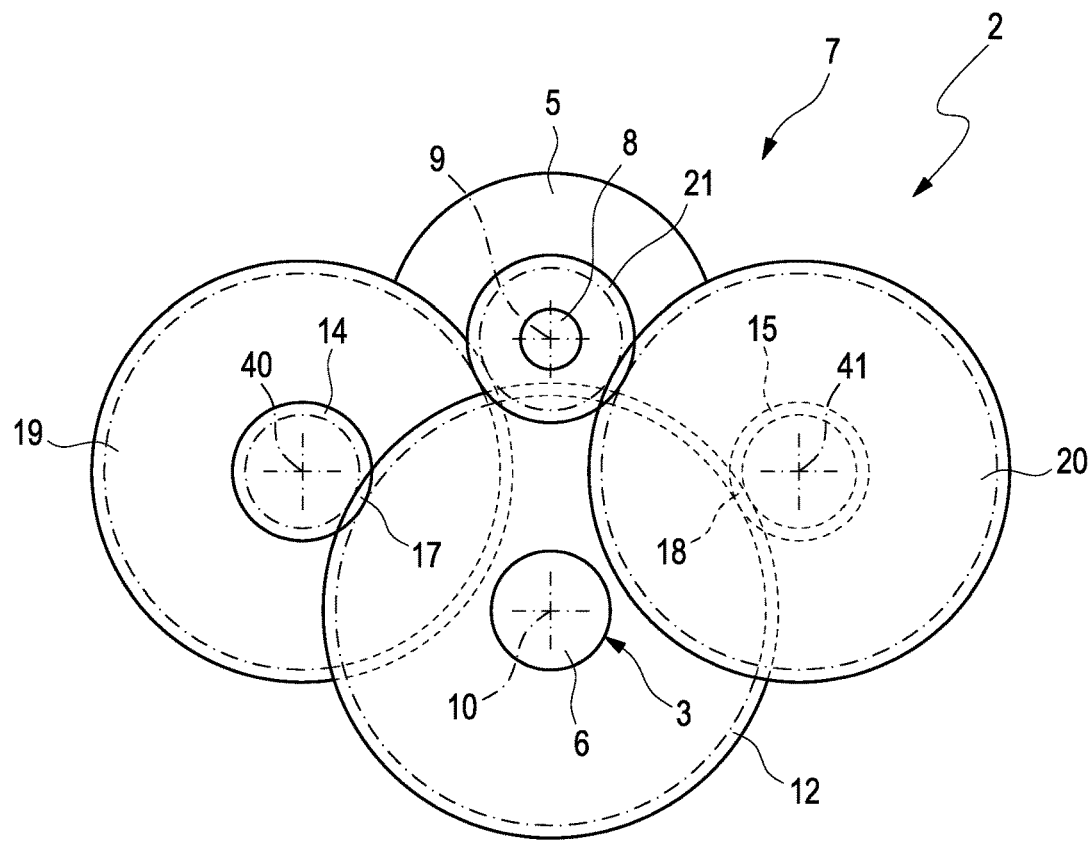
FIG. 7 shows an axial view of the drive from FIG. 6.
Figure 9:
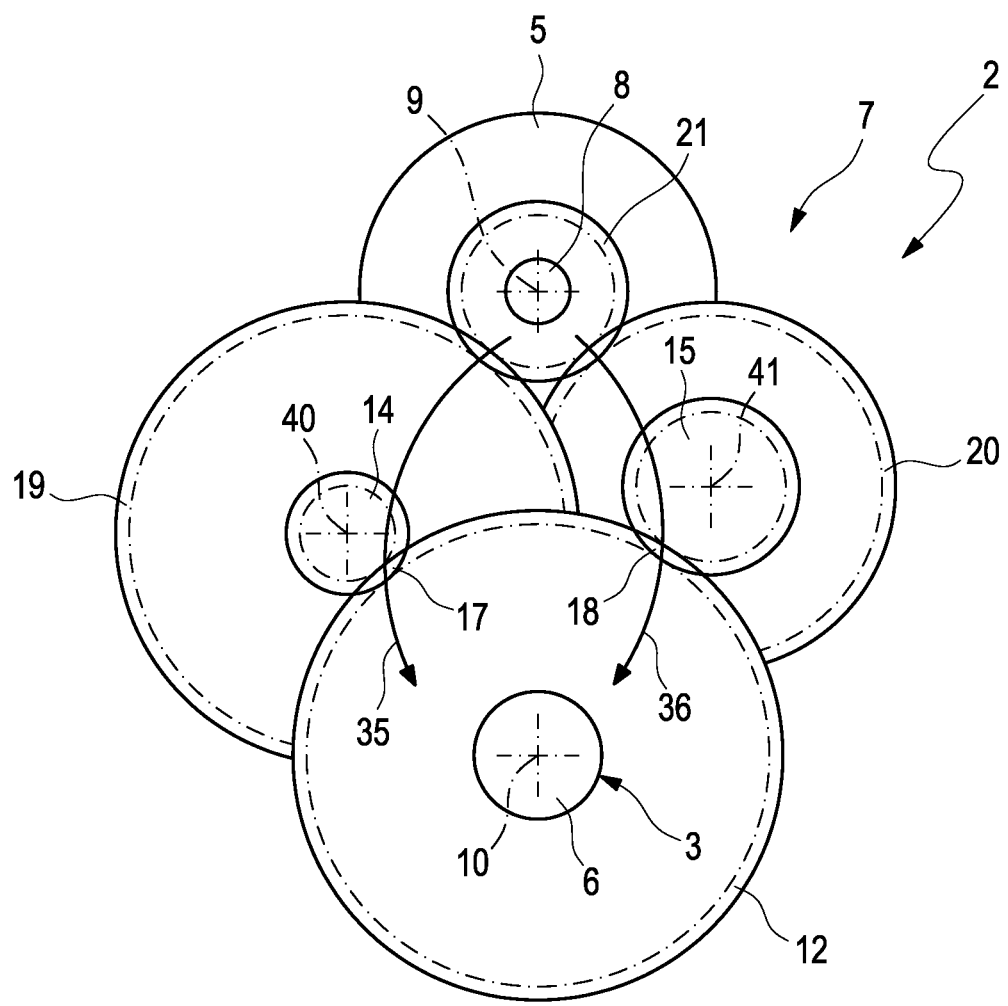
FIG. 9 shows an axial view of the drive, but in the case a yet again different embodiment.

The transmission 7 comprises a driven gear 12, preferably a gearwheel, which is connected in a rotationally fixed manner to the output shaft 6 in a rotational drive direction 13, which is suggested in FIGS. 4, 7, and 9 by means of an arrow. The transmission 7 further has at least two output gears, preferably a gearwheel each, namely a first output gear 14 and a second output gear 15. In the case of other examples, more than two output gears 14, 15 can also be present. In the schematic diagrams of FIGS. 1 and 2, only one of the output gears 14, 15 can in each case be seen. The respective output gear 14, 15 serves to drive the driven gear 12 and engages with the driven gear 12 for this purpose. The two output gears 14, 15 are thereby arranged offset to one another on the driven gear 12 in the circumferential direction 16 of the driven gear 12 as suggested by a double arrow in FIGS. 4, 7, and 9. To transfer the drive power of the electric motor 5 to the driven gear 12 via the two output gears 14, 15, a power distribution is realized in the transmission 7.

This power distribution can generally distribute the drive power to the at least two output gears 14, 15 in an arbitrary, suitable ratio. An even or symmetrical power distribution, respectively, to the output gears 14, 15 is preferred here. In the case of exactly two output gears 14, 15, a power distribution in the ratio of 1:1 is thus preferred.

The first output gear 14 thereby rotates about a first axis of rotation 40, while the second output gear 15 rotates about a second axis of rotation 41. These axes of rotation 40, 41 are stationary, i.e., the two axes of rotation 40, 41 are arranged in a stationary manner inside the transmission 7. In other words, the two axes of rotation 40, 41 do not change their spatial position inside the transmission 7 during operation of the drive 2.

It can be gathered from FIGS. 4 to 9, how the two output gears 14, 15 in each case individually engage with the driven gear 12, spaced apart from one another in the circumferential direction 16. The load of the respective engagement point is thereby significantly reduced. A first engagement point between the first output gear 14 and the driven gear 12 is thereby identified with 17, while a second engagement point between the second output gear 15 and the driven gear 12 is identified with 18.

Figure 3:
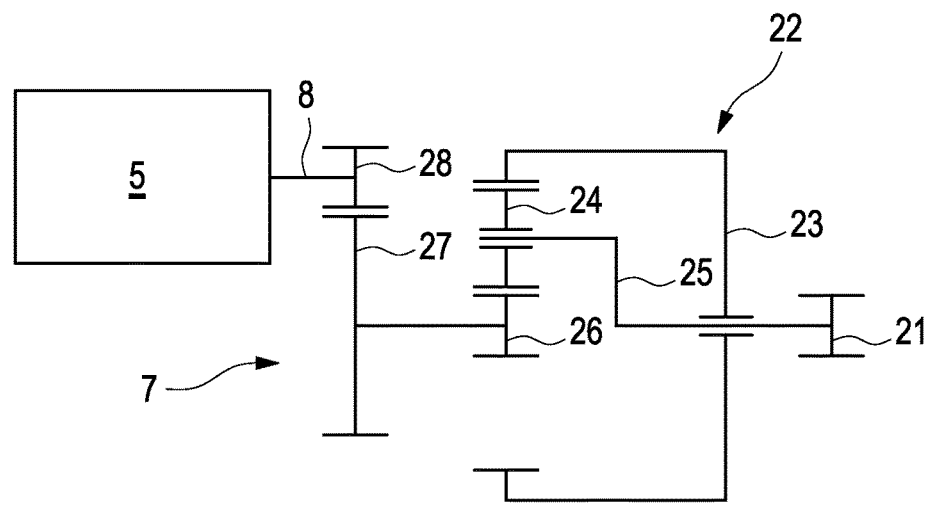
FIG. 3 shows a schematic diagram of a part of the electric drive, but in the case of a further embodiment.

According to FIGS. 4 to 9, the first output gear 14 is connected in a rotationally fixed manner to a first intermediate gear 19, while the second output gear 15 is connected in a rotationally fixed manner to a second intermediate gear 20. In the simplified illustrations of FIGS. 1 and 2, only one of the intermediate gears 19, 20 can be seen in each case. The transmission 7 is furthermore equipped with an input gear 21, which in each case engages with the first intermediate gear 19 and with the second intermediate gear 20. In the examples of FIGS. 1, 2, and 4 to 9, this engagement gear 21 is connected in a rotationally fixed manner to the drive shaft 8. In contrast, FIG. 3 shows another embodiment merely in an exemplary manner, in the case of which the input gear 21 is connected to the drive shaft 8 via further transmission sections. In the example of FIG. 3, the transmission 7 comprises a planetary transmission 22, via which the input gear 21 is connected to the drive shaft 8. In the usual way, the planetary transmission 22 thereby has a ring gear 23, planet gears 24, which engage with the ring gear 22, a planet gear carrier 25, on which the planet gears 24 are rotatably supported, and a sun gear 26, which engages with the planet gears 24. In the example of FIG. 3, the sun gear 26 is connected to the drive shaft 8 via a further transmission stage, which is formed by two gearwheels 27 and 28. The input gear 21 is connected in a rotationally fixed manner to the planet gear carrier 25 here.

In the case of the embodiments shown in FIGS. 4 to 9, the first intermediate gear 19 has a larger number of teeth than the first output gear 14. The second intermediate gear 20 likewise has a larger number of teeth than the second output gear 15. In the case of the embodiment shown in FIGS. 4 and 5, the first intermediate gear 19 and the second intermediate gear 20 are arranged on the same axial side of the driven gear 12 and radially engage over the driven gear 12 there. A radial overlap of the two intermediate gears 19, 20 by the driven gear 12 thus results in the axial view shown in FIG. 4.

Figure 6:
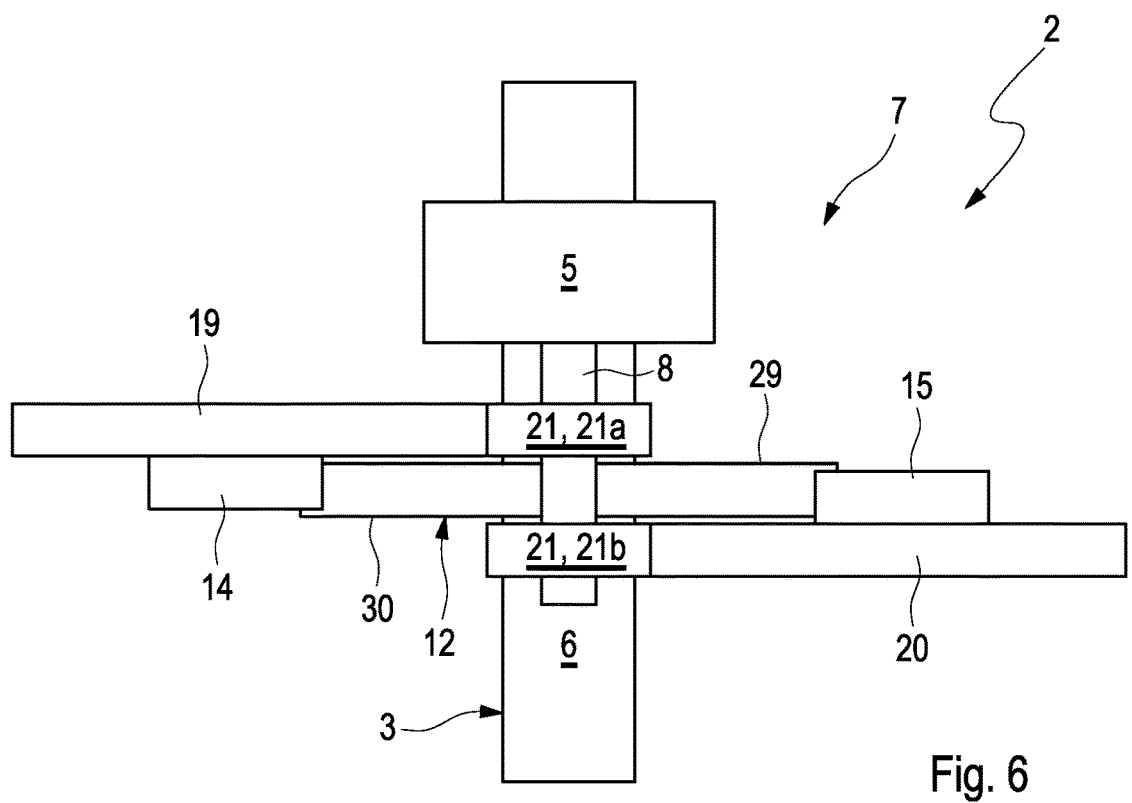
FIG. 6 shows a radial view of the drive, but in the case of another embodiment.

In FIGS. 6 and 7, in contrast, it is provided that the first intermediate gear 19 radially engages over the driven gear 12 on a first axial side 29, while the second intermediate gear 20 radially engages over the driven gear 12 on a second axial side 30. In the case of an arrangement of the intermediate gears 19, 20, of the driven gear 12, and of the input gear 21 relative to one another, as in FIG. 4, an axially undivided, continuous input gear 21 can be used for driving the two intermediate gears 19, 20. In contrast, in the case of the relative arrangement of the intermediate gears 19, 20, of the driven gear 12, and of the input gear 21 relative to one another, as shown in FIG. 7, the divided embodiment of the input gear 21 as shown in FIG. 6 is preferred. According to FIG. 6, the input gear 21 is axially divided, so that it has a first partial input gear 21a and a second partial input gear 21b, which are axially spaced apart from one another and which are each independently connected in a rotationally fixed manner to the drive shaft 8. The first partial input gear 21a engages with the first intermediate gear 19 on the first axial side 29 of the driven gear 12. The second partial input gear 21b engages with the second intermediate gear 20 on the second axial side 30 of the driven gear 12. In the case of the arrangement shown in FIG. 7, a radial overlap results between the partial input gears 21a, 21b and the driven gear 12 in the axial viewing direction. The drive shaft 8 can thus be positionally radially close to the circumference of the driven gear 12.

Figure 5:
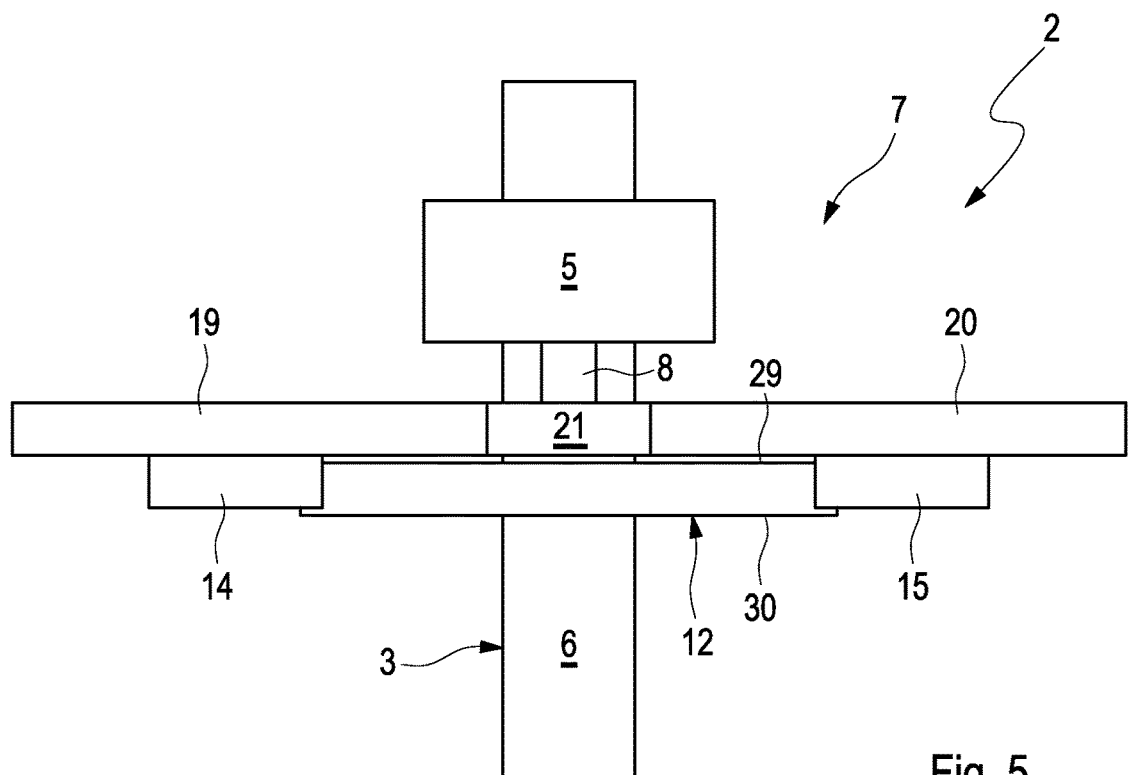
FIG. 5 shows a radial view of the drive from FIG. 4.

In the example of FIG. 5, the two intermediate gears 19, 20 engage with the input ear 21 in the same axial section. The input gear 21 can thus be dimensioned approximately equally large as the two intermediate gears 19, 20. The intermediate gears 19, 20 and the input gear 21 can thus in particular be arranged in the same axial plane.

Figure 8:
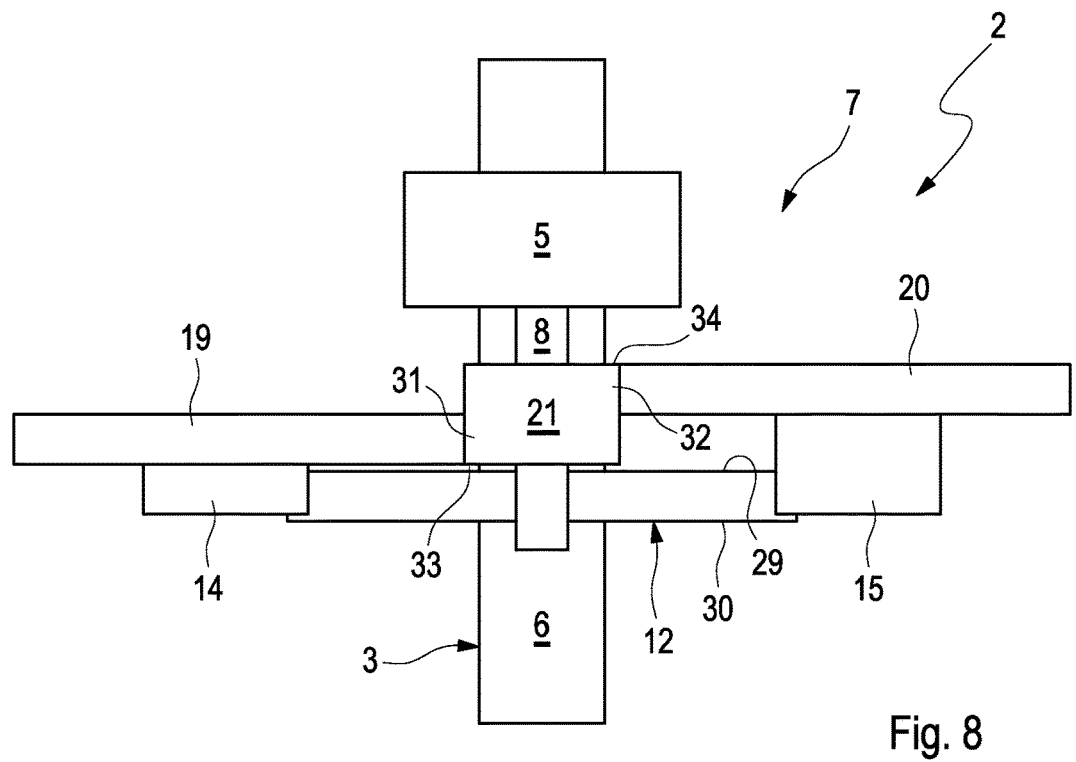
FIG. 8 shows a radial view of the drive, but in the case of another embodiment.

In contrast, FIG. 8 shows an embodiment, in the case of which the first intermediate gear 19 engages with a first axial section 31 of the input gear 21, while the second intermediate gear 20 engages with a second axial section 32 of the input gear 21. The second axial section 32 is thereby arranged on the input gear 21 axially offset to the first axial section 31. It can in particular be provided that the first axial section 31 of the input gear 21 has a first axial end 33 of the input gear 21 and is axially spaced apart from a second axial end 34 of the input gear 21. The second axial section 32 of the input gear 21, in contrast, can have the second axial end 34 of the input gear 21 and can be axially spaced apart from the first axial end 33 of the input gear 21. The first intermediate gear 19 engages with the input gear 21 axially spaced apart from the second axial end 34 of the input gear 21. The second intermediate gear 20 engages with the input gear 21 axially spaced apart from the first axial end 33 of the input gear 21. The first intermediate gear 19 and the second intermediate gear 20 thus engage with the input gear 21 axially offset to one another. A configuration according to FIG. 9 can thereby generally also be realized, in the case of which the first intermediate gear 19 and the second intermediate gear 20 engage over one another, viewed in the axial direction.

In the case of all of the embodiments shown here, a first transmission path and a second transmission path are embodied inside the transmission 7, which are in each case suggested by means of an arrow in FIG. 9 and which are identified with 35 for the first transmission path and with 36 for the second transmission path. The first transmission path 35 leads from the input gear 21 via the first intermediate gear 19 and via the first output gear 14 to the driven gear 12. The second transmission path 36 leads from the input gear 21 via the second intermediate gear 20 and via the second output gear 15 to the driven gear 12. Both transmission paths 35, 36 define the same transmission ratio. In the case of the embodiments of FIGS. 4 to 8, the first intermediate gear 19 has the same number of teeth as the second intermediate gear 20. The first output gear 14 likewise has the same number of teeth as the second output gear 15. The intermediate gears 19, 20 and the output gears 14, 15 can thus be realized as identical parts, which are interchangeable. In the example of FIG. 9, in contrast, it is provided that the two intermediate gears 19, 20 have different numbers of teeth. The two output gears 14, 15 simultaneously also have different numbers of teeth. In the example of FIG. 9, the first intermediate gear 19 has a larger number of teeth than the second intermediate gear 20. Proportionally thereto, the first output gear 14 then has a smaller number of teeth than the second output gear 15. The coordination of the number of teeth then takes place in such a way that the two transmission paths 35, 36 ultimately realize the same transmission ratio again.

In the preferred embodiments, the driven gear 12 is connected to the driven shaft 6 via a freewheel assembly 37 according to FIGS. 1 and 2. This freewheel assembly 37 transmits a torque from the driven gear 12 to the driven shaft 6 in the rotational drive direction 13. In a counter-rotational direction 38, which is suggested by means of an arrow in FIG. 4, which is oriented opposite to the rotational drive direction 13, the freewheel assembly 37, in contrast, allows for relative rotations between driven gear 12 and driven shaft 6. The driven shaft 6, for example, can thereby rotate in the rotational drive direction 13, while the driven gear 12 stands still or rotates with a lower speed than the driven shaft 6 in the rotational drive direction 13.

According to FIG. 2, the driven shaft 6 is advantageously embodied as hollow shaft and is coaxially permeated by the pedal shaft 3. The pedal shaft 3 is connected in a rotationally fixed manner to the driven shaft 6 in the rotational drive direction 13. The pedal shaft 3 is advantageously connected to the driven shaft 6 via a further freewheel assembly 39. This further freewheel assembly 39 operates between driven gear 12 and driven shaft 6 in the same way as the above-described freewheel assembly 37. The further freewheel assembly 39 accordingly transmits a torque from the pedal shaft 3 to the driven shaft 6 in the rotational drive direction 13, while it allows for a relative rotation between pedal shaft 3 and driven shaft 6 in the counter-rotational direction 38. The driven shaft 6 can thereby rotate in the rotational drive direction 13, while the pedal shaft 3 stands still or rotates in the counter-rotational direction 38 or rotates with a lower speed than the driven shaft 6 in the rotational drive direction 13.

Advantageously, the input axis 9 and the output axis 10 run parallel to one another, but radially spaced apart from one another. Axes of rotation 40, 41 of the first output gear 14 or of the first intermediate gear 19, respectively, and of the second output gear 15 or of the second intermediate gear 20, respectively, advantageously also extend parallel to the input axis 9 and parallel to the output axis 10.

Advantageously, the output gears 14, 15, the input gear 21, the intermediate gears 19, 20, and the driven gear 12 are made of plastic. In contrast, the pedal shaft 3 and/or the driven shaft 6, the drive shaft 8, and the driving hear 11 are advantageously made of metal.

As can in particular be gathered from FIGS. 4 to 7 and 9, the output gears 14, 15 are arranged geometrically between the drive shaft 8 and the driven shaft 6 in the case of the embodiments shown here. In the installed state of the drive 2, the drive shaft 8 is located on a side of the driven shaft 6 facing away from a surface not shown here, when the bicycle 1, which is equipped with the drive 2, stands or moves on this surface. Apart from the driven gear 12, the entire remaining transmission 7 is consequently located essentially above the driven shaft 6.

The invention claimed is:

1. An electric drive for a bicycle, comprising:
an electric motor including a drive shaft;
a driven shaft connected in a rotationally fixed manner to a driving gear for coupling to a wheel drive;
a transmission, structured and arranged to drivingly connect the drive shaft to the driven shaft;
wherein the transmission includes a driven gear, which is connected in a rotationally fixed manner to the driven shaft in a rotational drive direction, and at least two output gears, the at least two output gears including a first output gear and a second output gear that each engage with the driven gear offset to one another in a circumferential direction of the driven shaft to drive the driven gear; and
wherein a first axis of rotation, about which the first output gear rotates, and a second axis of rotation, about which the second output gear rotates, are arranged inside the transmission in a stationary manner during operation.

2. The drive according to claim 1, wherein the first axis of rotation, about which the first output gear rotates, and the second axis of rotation, about which the second output gear rotates, are arranged geometrically between an output axis, about which the driven shaft rotates, and an input axis, about which the drive shaft rotates.

3. The drive according to claim 1, wherein:
the first output gear is connected in a rotationally fixed manner to a first intermediate gear;
the second output gear is connected in a rotationally fixed manner to a second intermediate gear; and
the transmission has an input gear, structured and arranged to engage with the first intermediate gear and with the second intermediate gear.

4. The drive according to claim 3, wherein:
the first intermediate gear has a larger number of teeth than the first output gear; and
the second intermediate gear has a larger number of teeth than the second output gear.

5. The drive according to claim 4, wherein:
the first intermediate gear radially engages over the driven gear on a first axial side; and
the second intermediate gear radially engages over the driven gear on a second axial side.

6. The drive according to claim 5, wherein the input gear is axially divided into a first partial input gear that engages with the first intermediate gear on the first axial side of the driven gear, and a second partial input gear that engages with the second intermediate gear on the second axial side of the driven gear.

7. The drive according to claim 4, wherein the first intermediate gear and the second intermediate gear radially engage over the driven gear on the same axial side.

8. The drive according to claim 7, wherein:
the first intermediate gear engages with a first axial section of the input gear, and
the second intermediate gear engages with a second axial section of the input gear, wherein the second axial section is arranged on the input gear axially offset to the first axial section.

9. The drive according to claim 8, wherein:
the first axial section of the input gear has a first axial end of the input gear and is axially spaced apart from a second axial end of the input gear;
the second axial section of the input gear has the second axial end of the input gear and is axially spaced apart from the first axial end of the input gear;
the first intermediate gear engages with the input gear axially spaced apart from the second axial end of the input gear; and
the second intermediate gear engages with the input gear axially spaced apart from the first axial end of the input gear.

10. The drive according to claim 4, wherein the first intermediate gear and the second intermediate gear engage with the input gear axially offset to one another.

11. The drive according to claim 10, wherein the first intermediate gear and the second intermediate gear radially engage over one another.

12. The drive according to claim 3, wherein:
a first transmission path leads from the input gear via the first intermediate gear and the first output gear to the driven gear;
a second transmission path leads from the input gear via the second intermediate gear and the second output gear to the driven gear; and
the first transmission path and the second transmission path define the same transmission ratio.

13. The drive according to claim 12, wherein:
the first intermediate gear and the second intermediate gear have the same number of teeth; and
the first output gear and the second output gear have the same number of teeth.

14. The drive according to claim 12, wherein:
the first intermediate gear and the second intermediate gear have different numbers of teeth; and
the first output gear and the second output gear have different numbers of teeth.

15. The drive according to claim 3, wherein the input gear is connected in a rotationally fixed manner to the drive shaft.

16. The drive according to claim 3, wherein the transmission has a planetary transmission drivingly arranged between the drive shaft and the input gear.

17. The drive according to claim 16, wherein the planetary transmission has a sun gear is drivingly coupled directly or indirectly to the drive shaft, a plurality of planet gears, a planet carrier, and a ring gear, wherein the planet carrier is connected in a rotationally fixed manner to the input gear.

18. The drive according to claim 1, wherein the driven shaft is provided by a pedal shaft.

19. The drive according to claim 1, wherein at least one of the at least two output gears, the input gear, and the driven gear is composed of plastic.

20. A bicycle, comprising:
a pedal shaft;
a wheel drive for driving a driven wheel of the bicycle;
an electric drive, the electric drive including:
an electric motor including a drive shaft;
a driven shaft connected in a rotationally fixed manner to a driving gear for coupling to the wheel drive;
a transmission, structured and arranged to drivingly connect the drive shaft to the driven shaft;
wherein the transmission includes a driven gear connected in a rotationally fixed manner to the driven shaft in a rotational drive direction, and at least two output gears that respectively engage with the driven gear offset to one another in a circumferential direction of the driven shaft to drive the driven gear; and
wherein the at least two output gears are arranged on a side of the driven shaft facing away from a ground surface when in operation.

21. The bicycle according to claim 20, wherein, apart from the driven gear, the transmission is arranged above the driven shaft when operating on a surface.

22. An electric drive for a bicycle, comprising:
an electric motor including a drive shaft;
a driven shaft connected in a rotationally fixed manner to a driving gear for coupling to a wheel drive;
a transmission, structured and arranged to drivingly connect the drive shaft to the driven shaft;
wherein the transmission includes a driven gear, which is connected in a rotationally fixed manner to the driven shaft in a rotational drive direction, and at least two output gears, the at least two output gears including a first output gear and a second output gear that each engage with the driven gear offset to one another in a circumferential direction to drive the driven gear; and
wherein the driven shaft is a hollow shaft and is coaxially permeated by a pedal shaft, wherein the pedal shaft is connected in a rotationally fixed manner to the driven shaft in the rotational drive direction.

* * * * *